United States Patent

Zawaideh

[11] Patent Number: 5,999,267
[45] Date of Patent: Dec. 7, 1999

[54] NONDESTRUCTIVE OPTICAL TECHNIQUES FOR SIMULTANEOUSLY MEASURING OPTICAL CONSTANTS AND THICKNESSES OF SINGLE AND MULTILAYER FILMS

[76] Inventor: Emad Zawaideh, 910 Monte Mira Dr., Encinitas, Calif. 92024

[21] Appl. No.: 09/263,543

[22] Filed: Mar. 8, 1999

[51] Int. Cl.$^6$ .................................................. G01B 11/06
[52] U.S. Cl. .......................... 356/381; 356/371; 356/359; 356/357
[58] Field of Search .................................. 356/357, 371, 356/359, 360, 381

[56] References Cited

U.S. PATENT DOCUMENTS

| 4,141,780 | 2/1979 | Klienbnecht et al. | 315/357 |
| 4,355,903 | 10/1982 | Sandercock | 356/357 |
| 5,341,211 | 8/1994 | Printzhausen et al. | 356/357 |

Primary Examiner—Robert H. Kim
Attorney, Agent, or Firm—Kenneth W. Float

[57] ABSTRACT

An optical technique (apparatus and method based on the use of power spectral density analysis of spectroscopic multiple angle reflection and transmission data is disclosed. The apparatus and methods measure optical constants (n, k) and thicknesses of single and multilayer films. The apparatus and method provide for index determination with high accuracy (0.00001).

3 Claims, 5 Drawing Sheets

NONDESTRUCTIVE OPTICAL TECHNIQUES FOR SIMULTANEOUSLY MEASURING OPTICAL CONSTANTS AND THICKNESSES OF SINGLE AND MULTILAYER FILMS

BACKGROUND

The present invention relates generally to optical techniques for measuring the thickness of optical films, and more particularly, to apparatus and methods using nondestructive optical techniques for simultaneously measuring optical constants and thicknesses of single and multilayer films.

Currently, there are several methods to determine the optical constants of thin films. These methods are described in the following references. The "Handbook of Optical Constants of Solids", edited by E. D. Palik (academic Press, NY, 1985) describes measurement of normal-incidence reflectance and transmittance over a wide spectral range.

The "Handbook of Optical Constants of Solids II", edited by E. D. Palik (academic Press, NY, 1991) describes measurement of R and T for normal and oblique angles of incidence (45°; 60°) for the polarizations TE and Tm, over a wide spectral range. In "Physics of Thin Films", Vol. 2, by O. S. Heavens, edited by G. Hass and R. E. Thum (Academic Press, NY, 1964), using ellipsometry to measurement the polarization states of collimated monochromatic light before and after reflection from a surface to obtain the ratio $r=R_P/R_S,=\tan \psi \exp(i\, \Delta)$ of the complex p and s reflection coefficients is discussed. These methods of determining the optical constants (n and k), however, are complicated and at times yield inaccurate results.

The major disadvantage of the first two methods is that the optical constants are determined from the magnitude of the reflection spectrum which cannot be measured accurately ($\Delta R \sim \pm 0.3\%$). The measurement errors in the reflection magnitude introduce significant errors in the optical constants ($\Delta n \sim \pm 1\%$).

In general, the three above-cited methods are not appropriate for determining simultaneously and accurately the optical constants and thickness of relatively thick layers (greater than $20\lambda$; greater than 10 $\mu$m, where $\lambda$ is the wavelength).

It would therefore be desirable to have an optical film thickness measuring apparatus and method that overcomes the limitations of conventional approaches. Accordingly, it is an objective of the present invention to provide for nondestructive optical techniques, including apparatus and methods, for simultaneously measuring optical constants and thicknesses of single and multilayer films.

SUMMARY OF THE INVENTION

To accomplish the above and other objectives, the present invention overcomes the difficulties of prior art approaches by using the concept of relative shift (ratio) of power spectral density as a function of incident angle to simultaneously measure optical constants and thickness of single and multilayer films. The present method is particularly applicable to thick films of greater than $\lambda/4$.

The present invention measures reflectance, transmittance, or polarized reflectance or transmittance for normal and oblique angles of incidence over a wide spectral range, using a spectrophotometer, for example. The following methodology is then used to determine the optical constants (n, k) and thickness of single and multilayer films. Power spectral density functions of the measured spectra (i.e., reflectance, transmittance, or polarized reflectance or transmittance) for normal and oblique angles of incidence as a function of frequency are calculated. Statistically significant peaks of the power spectral density functions are then determined. For a single layer only the most significant peak (maximum peak) is considered. The positions of the peaks of power spectral density functions at angles of incidence $\theta_k$, where $\theta_0$ represent normal incidence are determined. The unknown parameters of the film are modeled using a dispersion formula that is capable of describing the dispersion in the optical constants (n, k) in the measured wavelength range. The dispersion formula is used to produce simulated values for the locations of the statistically significant peaks and the ratio of the simulated locations of the peaks.

Then, the thicknesses and coefficients of the dispersion formula (optical constants) of the unknown layers are determined. Nonlinear global optimization algorithms are used to minimize an error function (merit function or loss function) of experimental (measured) and theoretical data (modeled). Depending on the optimization technique used a single merit (error) function may be defined for all the data respectively. For gradient optimization methods each fitted parameter has its own merit function which is minimized/maximized.

Each set of data can have different weighting factors. The present invention is not sensitive to errors in the magnitude of the measured reflectance, transmittance, or polarized reflectance or transmittance. In the extreme case of large errors in the magnitude of the reflectance, transmittance, or polarized reflectance or transmittance, one can fit only on the power spectral density parameters. A consistency check may be achieved by repeating the above steps at multiple angles and different polarization.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
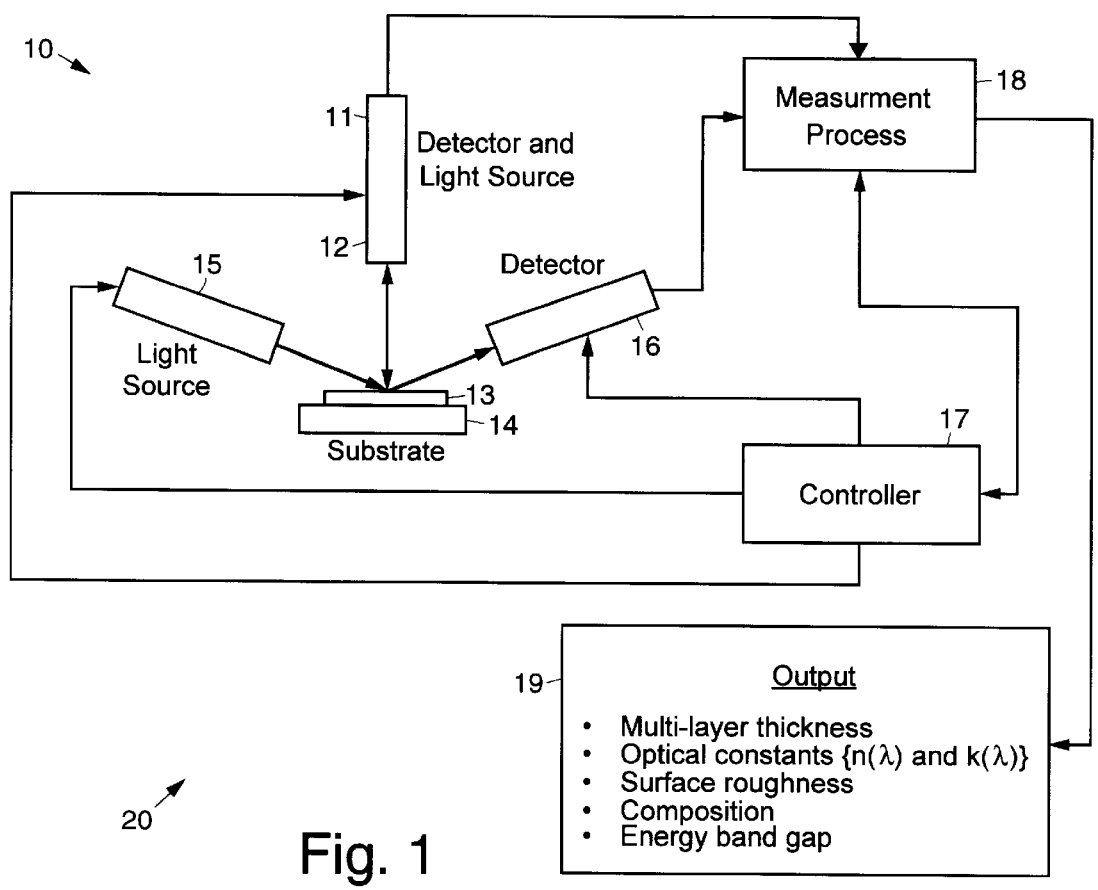
FIG. 1 illustrates instrument configurations in which a simultaneous spectroscopic measurement at multiple angles of the surface of a film or wafer is performed in accordance with the principles of the present invention.

Referring to the drawing figures, FIG. 1 illustrates apparatus 10 in which a simultaneous spectroscopic measurement at multiple angles of the surface of a film 13 (or wafer 13) is performed using a measurement and calculation method 20 in accordance with the principles of the present invention. The apparatus 10 comprises a first light source 11 and a first detector 12 that are used to make spectroscopic measurements at a normal angle relative to the (single or multilayer) film 13 formed on a substrate 14. A second light source 15 and a second detector 16 are used to make spectroscopic measurements at an oblique angle of incidence relative to the film 13. A controller 17 is used to control each of the light sources 11, 15 and detectors 12, 16. Outputs of the respective detectors 12, 16 are processed by a computer 18.

These instruments and components are processed using a measurement and calculation method 20 in accordance with the principles of the present invention. The measurement and calculation method 20 produces an output 19 comprising the thickness of the (single or multilayer) film 13, optical constants n(λ) and k(λ) of the film 13, surface roughness data, composition data, and energy band gap data for the film 13. The present invention will be described in more detail with reference to FIG. 2, which is a flow chart illustrating the measurement and calculation method 20 in accordance with the principles of the present invention.

Figure 2:
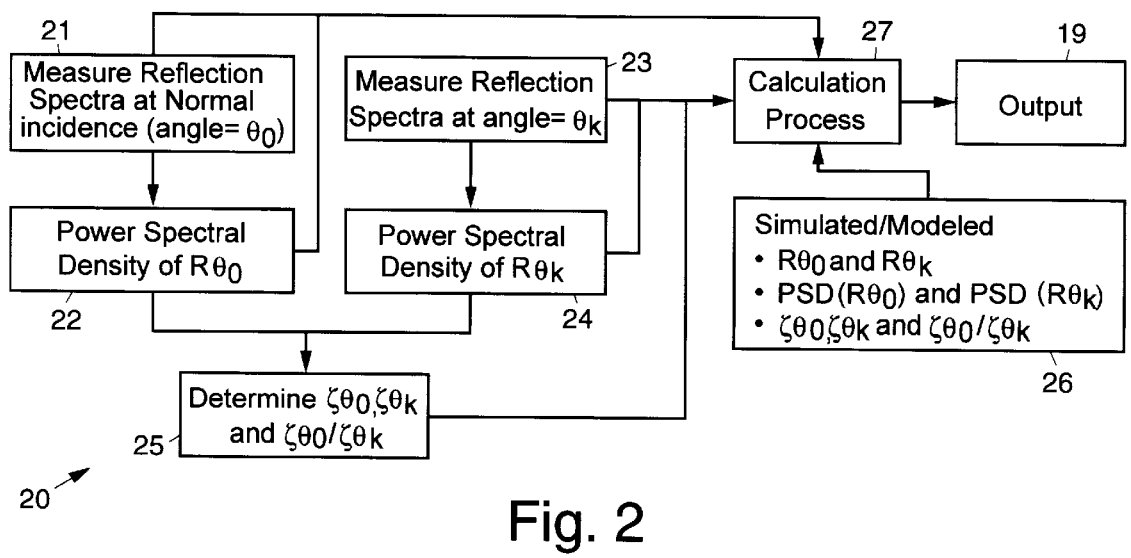
FIG. 2 is a flow chart of a measurement and calculation method in accordance with the principles of the present invention.

Referring to FIG. 2, it is a flow chart of one embodiment of the measurement and calculation method 20 in accordance with the principles of the present invention. In practicing the present method 20, the reflection spectra from the film 13 is measured 21 at normal incidence (angle=θ₀) using the first light source 11 and first detector 12. The power spectral density of the reflection spectra at θ₀ is computed 22. The reflection spectra from the film 13 is also measured 23 at the oblique angle of incidence (angle=θₖ) using the second light source 15 and second detector 16. The power spectral density of the reflection spectra at θₖ is computed 24. Statistically significant peaks (ξ) of the power spectral density spectra are then determined 25. The unknown optical constants are modeled 26. Then, the power spectral density measurements, the statistically significant peaks of the power spectral density spectra and the modeled optical constants are processed (compared 27) to determine 27 or calculate 27 the unknown thicknesses and coefficients of the dispersion formula (optical constants) of the film 13.

Figure 3:
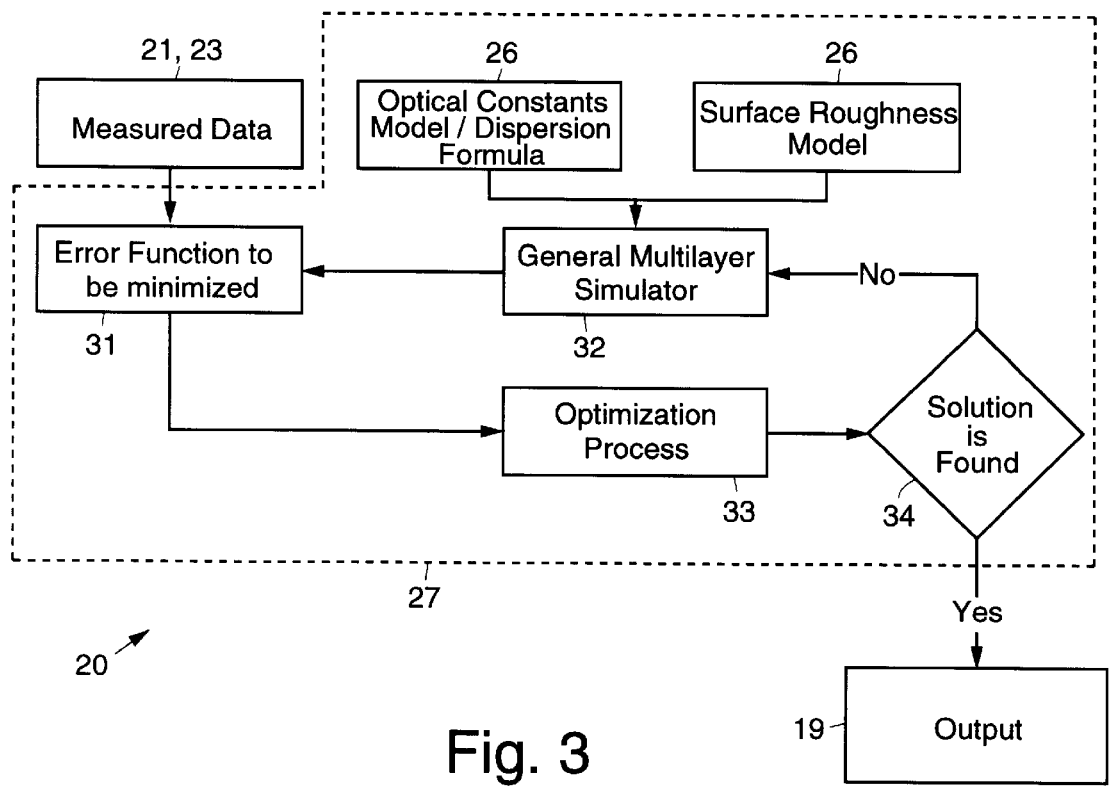
FIG. 3 is a flow chart that details the calculation method used in the method of FIG. 2.
Figure 4:
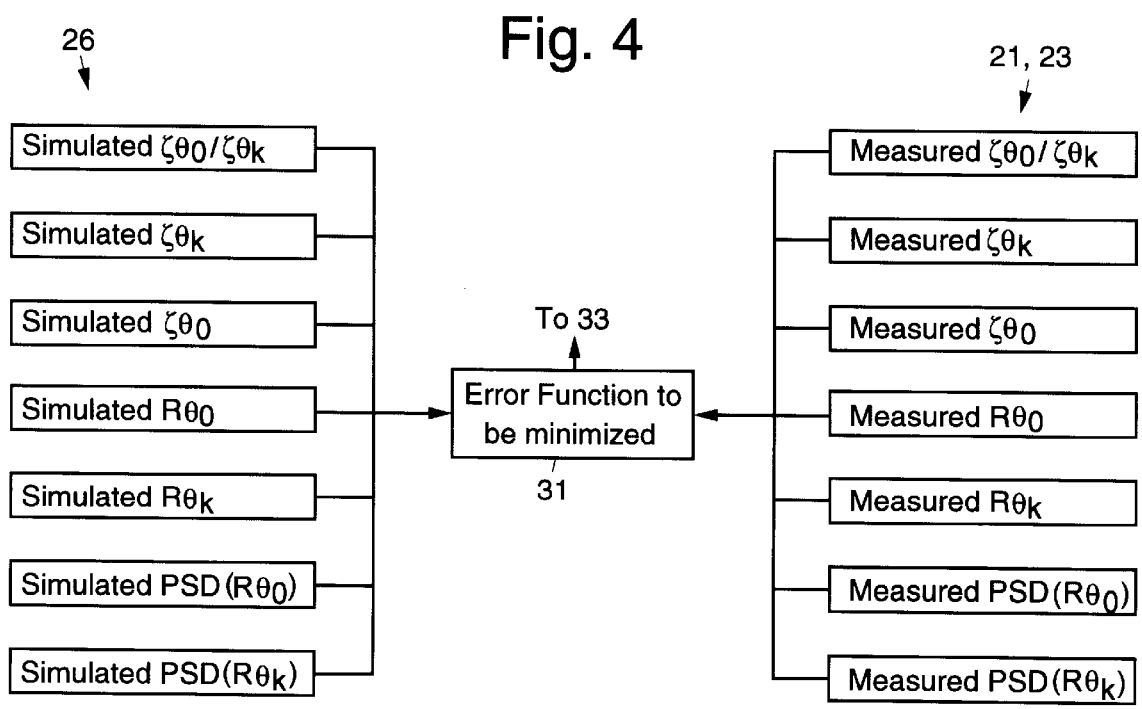
FIG. 4 illustrates input variables used to define the error function (penalty function) used in the calculation method of FIG. 3.

FIG. 3 is a flow chart that details the calculation method used the measurement and calculation method 20 shown in FIG. 2. The measured data 21, 23 are input to an error function 31 that is to be minimized. The modeled 26 unknown optical constants are input to a general multilayer simulator 32. FIG. 4 illustrates input variables used to define the error function 31 (penalty function) used in the calculation method of FIG. 3. The input variables are those that are modeled 26.

The output of the general multilayer simulator 32 is also input to the error function 31 that is to be minimized. The output of the error function 31 that is to be minimized is input to an optimization process 33 that uses a nonlinear global optimization algorithms to minimize a merit function (loss function or error function) of the experimental (measured) and theoretical data (modeled) data. The optimization process 33 is iterated 34 until a solution is found. Once a solution is found, the optimization process 33 produces the outputs 19 of the method 20.

The present invention uses the concept of relative shift (ratio) of power spectral density as a function of incident angle to simultaneously measure optical constants and thickness of single and multilayer films 13. The present method is particularly applicable to thick films 13 of greater than λ/4. The present invention will be described below in more detail, in terms of a mathematical description.

The method 20 measures reflectance (or transmittance) for normal and oblique angles of incidence (for example 45°; 70°) over a wide spectral range, using a spectrophotometer (the detectors 12, 16), for example. The method 20 then determines the optical constants (n, k) and thickness of single and multilayer films 13.

More specifically, in the present method 20, the power spectral density of the measured 21, 23 reflection spectra for normal and oblique angles of incidence as a function of frequency are calculated 22, 24. The statistically significant peaks of the power spectral density are determined 25. For a single layer one needs to consider only the most significant peak (maximum peak). The parameter $\xi^j_{\theta_k}$ is defined as the position of peak j of power spectral density at angle of incidence $\theta_k$, where $\theta_0$ represents normal incidence. More specifically, the parameters $\xi^j_{\theta_0}$, $\xi^j_{\theta_1}$ and $\xi^j_{\theta_1}/\xi^j_{\theta_0}$ are determined 25.

The unknown optical constants are modeled 26 using a general dispersion formula that is capable of describing the dispersion in the optical constants (n, k) in the measured wavelength range. The general dispersion formula may be one discussed in "Parameterization of the optical functions of amorphous materials in the interband region", by G. E. Jelison, Jr. and F. A. Modine, Appl. Phys. Lett. 69 (3), Jul. 15, 1996, and Appl. Phys. Lett. 69 (14), Sep. 30, 1996, and in the "FilmTek Manual" by Scientific Computing International, 1998.

The general dispersion formula developed by the present inventor is a generalization of the Lorentz oscillator model which defines a complex dielectric function $\epsilon = \epsilon_1 + I\epsilon_2$, wherein $\epsilon_1$ comprises a real part and $I\epsilon_2$ comprises an imaginary part, and is defined as follows:

$$\varepsilon_1^* = \sum_{j=1}^m \frac{a_j^2(E^2 - (E_{center})_j^2)}{[E^2 - (E_{center})_j^2] + V^2 E^2}$$

$$\varepsilon_2^* = \sum_{j=1}^m \frac{a_j^2 E v}{[E^2 - (E_{center})_j^2] + V^2 E^2}$$

if $\varepsilon_2^* > \varepsilon_1^* \alpha E$ or $E > E_{center}$ then $\varepsilon_1 = \varepsilon_x(\varepsilon_1^* - \varepsilon_2^* \alpha E + 1)$ $\varepsilon_2 = \varepsilon_x(\varepsilon_2^* + \varepsilon_1^* \alpha E)$ else $\varepsilon_1 = \varepsilon_x(\varepsilon_1^* - \varepsilon_2^* \alpha E + 1)$ $\varepsilon_2 = 0,$ where $\epsilon_1$ and $\epsilon_2$ are the real and imaginary part of the dielectric function, $\epsilon_\infty$ is the high-frequency lattice dielectric constant, $(E_{center})_j$ is the center energy of each oscillator. The physical significance of the center energy depends on the material type and spectral range being considered. For example, in modeling semiconductor materials the center energy is related to the transverse phonon frequency. $A_j$ is the amplitude (strength) of each oscillator. In modeling semiconductor materials the Amplitude is related to both the transverse and longitudinal phonon frequencies (Amplitude=$\sqrt{\omega_{L^2}-\omega_{T^2}}$). $v_j$ is the vibration frequency (broadening) of the "j" oscillator. E is the energy and α is the damping coefficient. In the limit of α=0 the dispersion formula reduces to the Lorentz oscillator model. The above equation is quite general and accurately applies to semiconductor, dielectric, amorphous, crystalline and metallic materials.

Then, thicknesses and coefficients of the dispersion formula (optical constants) of the unknown layers are determined 27. Nonlinear global optimization algorithms are used to minimize a merit function (loss function or error function) of experimental (measured) and theoretical data (modeled) data. The nonlinear global optimization algorithms are used to minimize the merit function of:

$\xi^j_{\theta_0}$, $\xi^j_{\theta_1}$ and $\xi^j_{\theta_1}/\xi^j_{\theta_0}$, or the power spectral density spectrums, or the reflection spectra for normal and oblique angles of incidence.

Depending on the optimization technique used a single merit function (error function) is defined for all data, namely:

$$\text{Merit Function} = \sum_{j=1}^{n} |Y_{exp_j} - Y_{calculated_j}|^{\beta} \leftarrow \rightarrow \text{weight}_j^{1/\beta}$$

where $Y_{exp_j}$ and $Y_{calculated_j}$ represent the experimental and calculated (simulated) data of parameter j. β=1,2 for Absolute deviation and least square options respectively. On the other hand, for gradient optimization methods each fitted parameter has its own merit function which is minimized/maximized, namely:

$$(\text{Merit Function})_j = |Y_{target_j} - Y_{calculated_j}|^{\beta} \leftarrow \rightarrow \text{weight}_j^{1/\beta}$$

Each set of data can have different weighting factors. It should be understood that the present invention is not sensitive to errors in the magnitude of the measured reflection. In the extreme case of large errors in the magnitude of the reflection one can fit only on the power spectral density parameters.

A consistency check may be achieved by repeating the above method steps at multiple angles and different polarization.

Presented below are two examples illustrating use of the present method 20.

EXAMPLE 1

To illustrate the significance of the present method 20, consider a simple example case of a single transparent film layer (k=0) with constant index of refraction (no dispersion). Reference is made to FIGS. 5–8 which pertain to Example 1.

Figure 5:
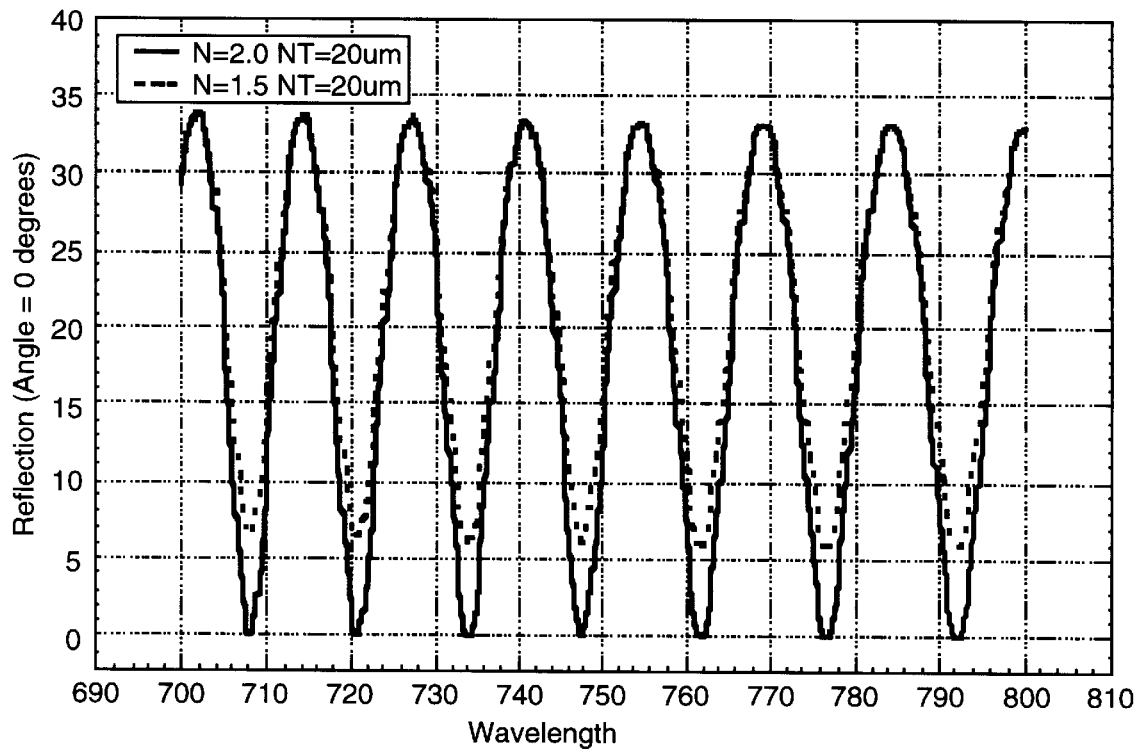
FIG. 5 illustrates simulated reflection as a function of wavelength for two example films with optical thickness of 20 $\mu$m and constant index of refraction of 2 and 1.5, respectively, and wherein the data was simulated at normal incidence (0 degrees)
Figure 6:
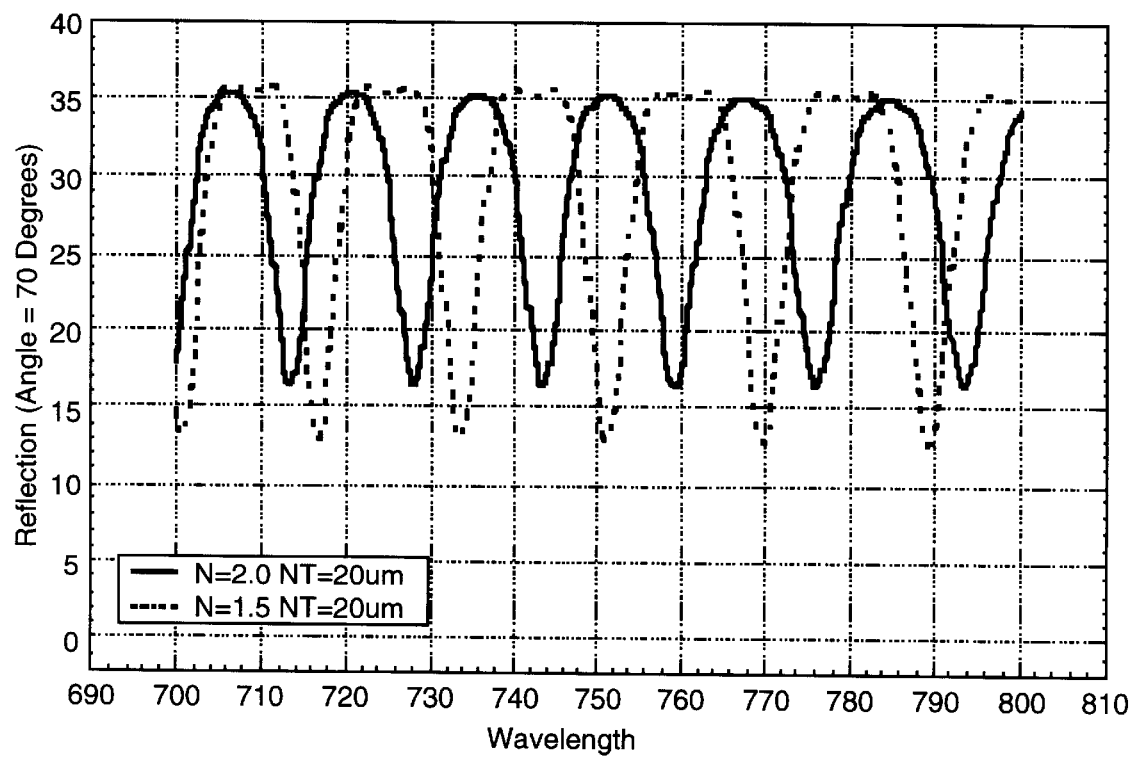
FIG. 6 illustrates simulated reflection as a function of wavelength for two example films with optical thickness of 20 $\mu$m and constant index of refraction of 2 and 1.5, respectively, and wherein the data was simulated at 70 degrees.
Figure 7:
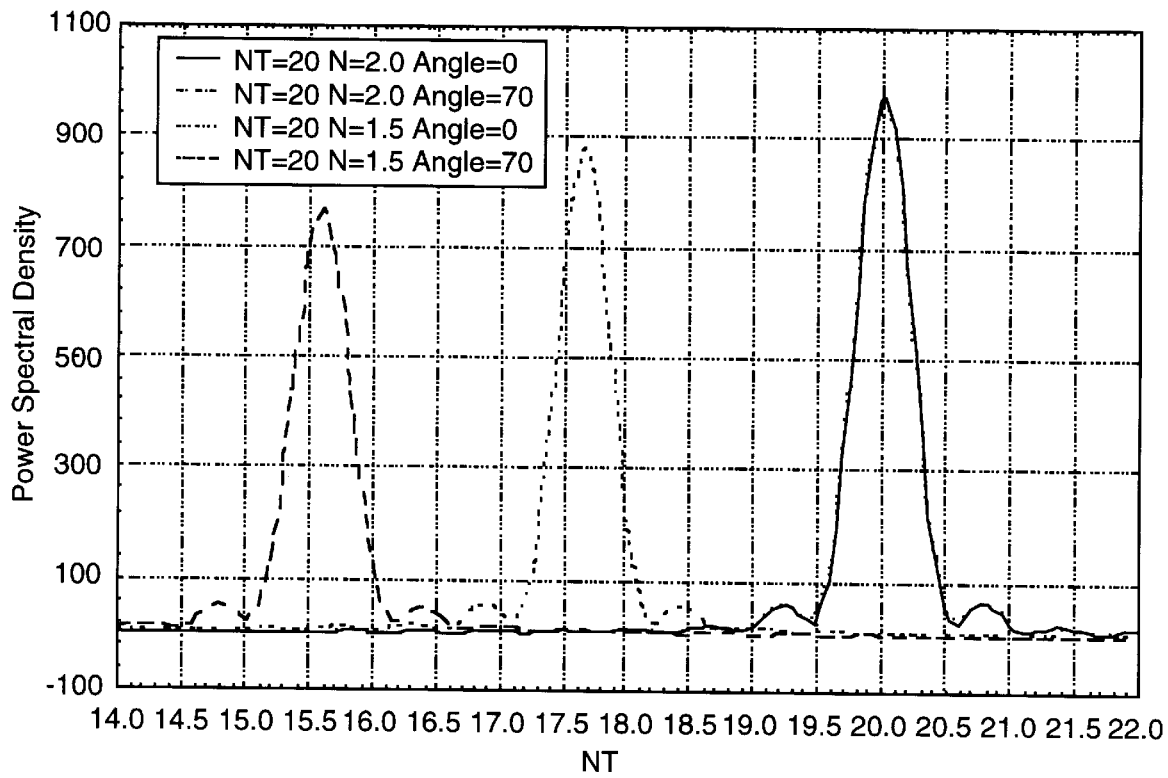
FIG. 7 illustrates simulated power spectral density for two example films with optical thickness (NT) of 20 $\mu$m and constant index of refraction of 2 and 1.5, respectively, and wherein the data was simulated at both 0 and 70 degrees.
Figure 8:
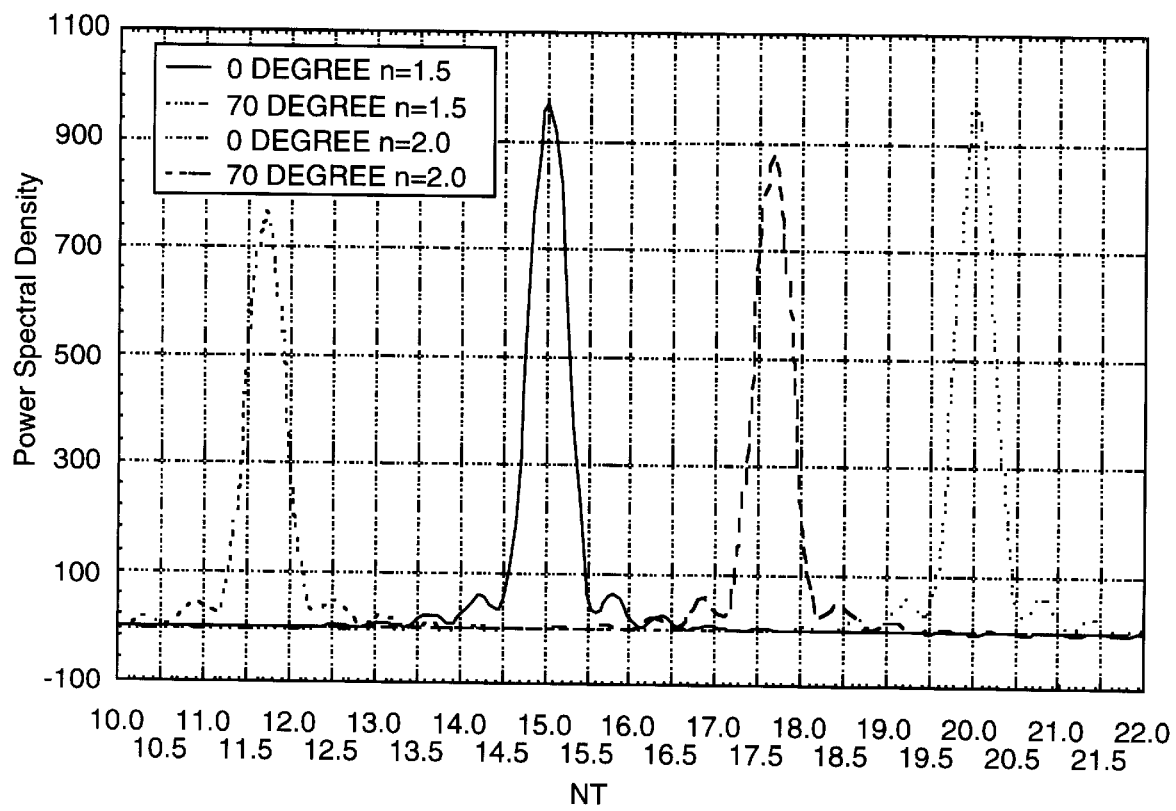
FIG. 8 illustrates simulated power spectral density for two example films with fixed thickness of 10 $\mu$m and constant index of refraction of 2 and 1.5, respectively, and wherein the data was simulated at both 0 and 70 degrees.

FIG. 5 illustrates simulated reflection as a function of wavelength for two example films 13 with optical thickness of 20 μm and constant index of refraction of 2 and 1.5, respectively, and wherein the data was simulated at normal incidence (0 degrees). FIG. 6 illustrates simulated reflection as a function of wavelength for two example films 13 with optical thickness of 20 μm and constant index of refraction of 2 and 1.5, respectively, and wherein the data was simulated at 70 degrees. FIG. 7 illustrates simulated power spectral density for two example films 13 with optical thickness (NT) of 20 μm and constant index of refraction of 2 and 1.5, respectively, and wherein the data was simulated at both 0 and 70 degrees. FIG. 8 illustrates simulated power spectral density for two example films 13 with fixed thickness of 10 μm and constant index of refraction of 2 and 1.5, respectively, and wherein the data was simulated at both 0 and 70 degrees.

If one performs a power spectral density measurement, PSD($R_0$), power spectral density analysis of the reflection magnitude at normal incidence (FIG. 5) as a function of frequency (2/λ where λ is the wavelength), and referring to FIGS. 7 and 8, one finds that PSD($R_0$) peaks at $$\zeta_0 \cup nT. \tag{Eq. 1}$$

Similarly PSD($R_k$), the power spectral density of the reflection magnitude at the oblique angle $\theta_k$ (FIG. 6), peaks at (FIGS. 7 and 8)

$$\zeta_k \cup nT\cos\varphi_k = nT\sqrt{1 - \frac{-\sin\theta_k}{n}^2}. \tag{Eq. 2}$$

The ratio of the $\zeta_k$ to $\zeta_0$ is given by $$R\zeta_k = \frac{\zeta_k}{\zeta_0} \cup \sqrt{1 - \frac{-\sin\theta_k}{n}^2}, \tag{Eq. 3}$$

where $\theta_k$ and $\phi_k$ are the angle of incidence defined in air and inside the film 13 respectively.

The index of refraction can be independently determined from $R\zeta_k$.

$$n = \frac{\sin\theta_k}{\sqrt{1 - (R\zeta_k)^2}}. \tag{Eq. 4}$$

EXAMPLE 2

Figure 9:
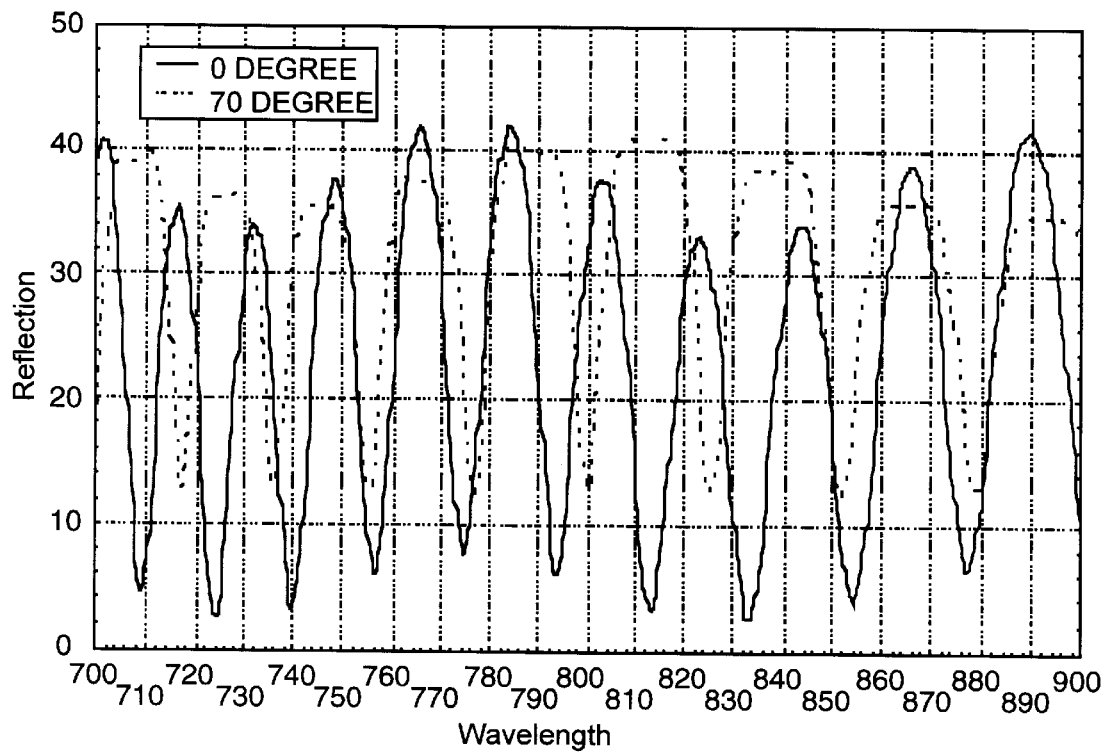
FIG. 9 illustrates reflection amplitude as a function of wavelength of polyimide on silicon dioxide on silicon, and wherein the data was simulated at both 0 and 70 degrees.
Figure 10:
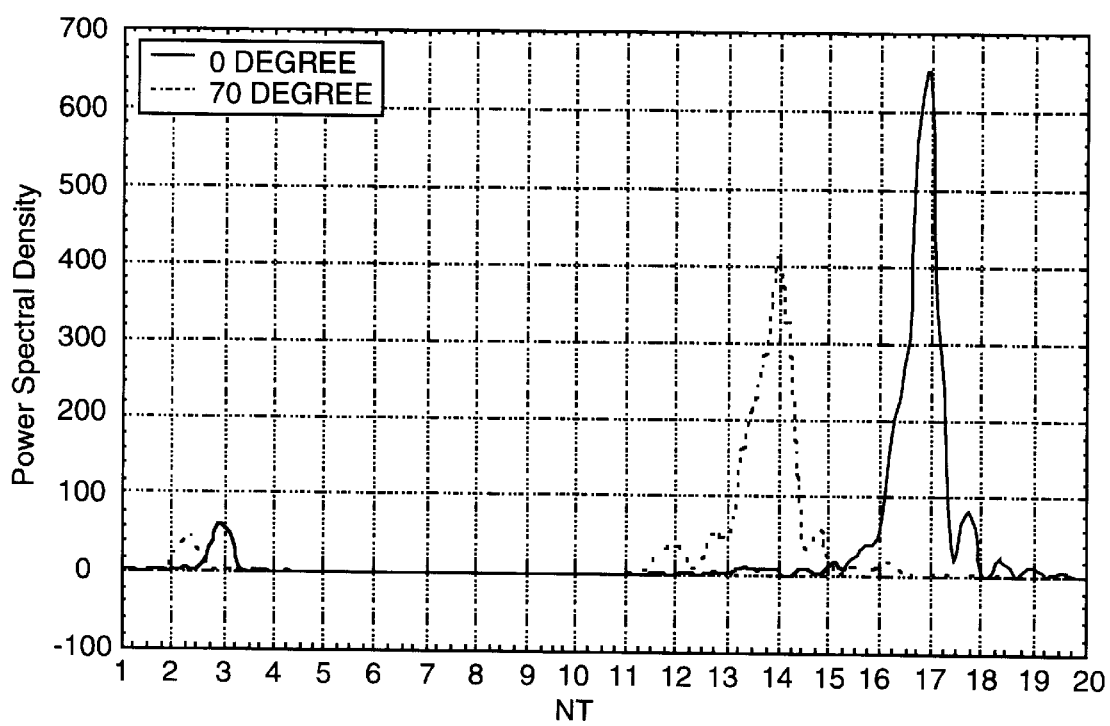
FIG. 10 illustrates power spectral density of polyimide (8 μm) on silicon dioxide (2 μm) on silicon, and wherein the data was simulated at both 0 and 70 degrees.

Reference is made to FIGS. 9 and 10 which pertain to Example 2. FIG. 9 illustrates reflection amplitude as a function of wavelength of polyimide on silicon dioxide on silicon, and wherein the data was simulated at both 0 and 70 degrees. FIG. 10 illustrates power spectral density of polyimide (8 μm) on silicon dioxide (2 μm) on silicon, and wherein the data was simulated at both 0 and 70 degrees.

The structure of the film 13 in this example is 8 μm polyimide on 2 μm silicon dioxide on silicon substrate 14. The reflections at normal incidence and at an oblique angle of 70 degrees are shown in (FIG. 9). The power spectral density is shown in (FIG. 10). FIG. 10 clearly shows a significant shift in both the silicon dioxide ($SiO_2$) and polyimide power spectral density peaks. These shifts in both peaks allow us to measure the index of refraction and thickness of both layers simultaneously.

It is important to note that, in general, the present method 20 does not impose any constraint on the value of wavelength dependence of index of refraction or extinction coefficient of the measured layer. The present apparatus 10 and method 20 allows for index determination with high accuracy (0.00001). The optical constants are modeled 26 using the dispersion formula, which accurately models the optical constants in the measured wavelength range. The present method 20 can also be used with polarized and random reflection and transmission data. Measurements at multiple angles can be used for consistency check and higher accuracy. The present method 20 is not sensitive to errors in reflection magnitude.

Thus, nondestructive optical techniques for simultaneously measuring optical constants and thicknesses of single and multilayer films has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for determining optical constants of single and multilayer films, said method comprising the steps of:

measuring predetermined spectra produced by the film;

modeling the measured spectra using a dispersion formula that is a generalized Lorentz oscillator model to produce simulated values for the spectra; and comparing the measured and simulated values of the spectra to determine the optical constants of the film.

2. The method of claim 1 wherein the predetermined spectra comprises spectra from the group including reflection spectra, transmission spectra, polarized reflection spectra, polarized transmission spectra and ellipsometric spectra.

3. The method of claim 2 wherein the dispersion formula is a generalization of the Lorentz oscillator model which defines a complex dielectric function $\epsilon = \epsilon_1 + I\epsilon_2$, wherein $\epsilon_1$ comprises a real part and $I\epsilon_2$ comprises an imaginary part, and wherein:

$$\varepsilon_1^* = \sum_{j=1}^{m} \frac{a_j^2(E^2 - (E_{center})_j^2)}{[E^2 - (E_{center})_j^2] + V^2 E^2}$$

$$\varepsilon_2^* = \sum_{j=1}^{m} \frac{a_j^2 E v}{[E^2 - (E_{center})_j^2] + V^2 E^2}$$

where $\epsilon_1$ and $\epsilon_2$ are the real and imaginary part of the dielectric function, $\epsilon_\infty$ is the high-frequency lattice dielectric constant, $(E_{center})_j$ is the center energy of each oscillator, $A_j$ is the amplitude of each oscillator, E is the energy and $\alpha$ is the damping coefficient.

* * * * *